Nov. 14, 1939.                    M. B. LUCKER                    2,180,307
                            BRAKE CONTROL MECHANISM

Filed Dec. 13, 1937

Inventor:
Millard B. Lucker
By:- Cox & Moore, attys.

Patented Nov. 14, 1939

2,180,307

UNITED STATES PATENT OFFICE 2,180,307

BRAKE CONTROL MECHANISM

Millard B. Lucker, St. Joseph, Mich., assignor to Auto Specialties Manufacturing Company, St. Joseph, Mich., a corporation of Michigan Application December 13, 1937, Serial No. 179,379

9 Claims. (Cl. 74—531)

This invention relates to brake operating or control mechanism and particularly to such a mechanism for operating the emergency brake of an automobile.

The common type of emergency brake control mechanism as employed at the present time comprises a hand lever carrying a spring pressed pawl which, in engaging the teeth of a ratchet, maintains the brake in set position. With such mechanism it often happens that when the lever has been moved to the position where the brakes are sufficiently tight, the pawl is between a pair of teeth on the ratchet; therefore the lever must be moved in a releasing direction to cause the pawl to engage the forward tooth of the pair of teeth or it must be moved rearwardly to engage it with the rearward tooth of the pair of teeth. If the lever is released to engage the forward tooth, the brakes will not be set in sufficiently tight position to hold the automobile on a hill and therefore the automobile, when no attendant is present, may become a menace to traffic and may coast down the hill and become wrecked. If the lever is pulled rearwardly to engage the rearward tooth, then the subsequent release of the brake is hard to effect. Furthermore, in the case of the present type brake control mechanism, the teeth of the ratchet are subject to considerable wear and are often chipped, thereby preventing holding of the brake in set position.

An object of this invention is to eliminate these disadvantages of the present type brake control mechanism by providing a mechanism which is capable of fine adjustment to set and maintain the brakes in locked position and which mechanism is rugged in construction.

Among the other objects of my present invention are to provide an improvement over the construction set forth and claimed in my prior pending application, Serial No. 149,875, filed June 23, 1937, entitled "Brake control mechanism", and specifically to provide improved means for releasing the locking mechanism which normally prevents the release of the brake when once set to a predetermined braking position.

Another object of my invention is to provide a braking mechanism of the more improved type wherein the brake is applied by the actuation of a relatively long operating lever in predetermined direction, and to provide this lever with a conveniently disposed, thumb operated secondary releasing lever which, when the main lever is grasped by the hand and when the thumb presses against the releasing lever, will cause the locking mechanism holding the braking lever in brake setting position to be immediately and very easily released to permit operation of the main brake lever in a reverse direction to release the brakes.

Yet another object of my invention resides in providing a brake operating mechanism for a vehicle wherein the brake may be applied by movement of a lever in one direction with a small expenditure of energy, coupled with the automatic locking of that lever in any number of finely adjusted brake setting positions, coupled with a conveniently disposed, easily operable means for instantly releasing the brake setting from any such adjusted position and for permitting, by retrograde movement of the brake setting lever, the release of the brake.

Other and further objects and advantages of the invention will be apparent from the following description when taken in connection with the accompanying drawing, wherein:

Fig. 1 is a view in elevation of a device embodying the invention and showing the same mounted upon the dash and connected to the brake operating mechanism;

Fig. 2 is a vertical sectional view taken on line 2—2 of Fig. 1;

Fig. 3 is an enlarged, fragmentary, detail sectional view taken on line 3—3 of Fig. 2; and Fig. 4 is the same type of view as Fig. 3, showing the mechanism in a different position.

As shown in Fig. 1, an angular bracket 2 having spaced feet 4 and 6 is secured to the dash 8 and cowl 10 of an automobile, fastening means such as bolts 12 passing through the feet 4 and 6 and the dash 8 and cowl 10. The bracket 2 is provided adjacent its upper end with an integral boss 14 drilled to receive a mounting stud 16 upon which is loosely journaled a bifurcated operating handle or lever 18. A supporting member, lug or projection 20 is formed integrally with and extends rearwardly from the mid-portion of the bracket 2. A rod 22 is pivoted thereto at its end 24 by a pin or stud 26. A housing or operating member 28 having top and bottom wall portions 30 and 32 and side wall portions 34, 36, 38 and 40 is slidably mounted on the rod 22. This rod passes through alined openings 42 and 44 in the wall portions 34 and 38. The wall 38 is provided with an integrally formed, forwardly extending lug 46 drilled as at 48 to receive an attaching clevis 50 by which the brake operating cable 52 is secured to the member 28.

A cam or locking member 54, having spaced lugs 56 and 58 and a central circular portion 60, is provided with a central opening of a diameter slightly greater than the diameter of the rod 22. The lugs 56 and 58 are bent in opposite directions out of the plane of the ring-shaped or central circular portion of the locking cam, whereby the diagonal opposed biting jaws or inner peripheral edges of the opening are thrown slightly closer together to give quicker gripping action upon movement of this cam. The cam member 54 is slidably received on the rod 22. The operating member 28 has an opening 62 slightly larger in dimensions than the lug 56 to receive said lug, whereby the cam member may have a slight pivotal movement relative to the operating member 28. The lug 58 of the cam member 54 is received in an elongated slot or opening 64 passing through the bottom wall 32 and communicating with the interior of the operating member 28. The side walls 36 and 40 are provided with enlarged openings 66 for permitting assembly of the mechanism. A spring 68 interposed between the cam member 54 and the wall 38 normally maintains the cam in tilted position relative to the rod 22 whereby to maintain the operating member 28 in locked position. The movement of the cam member 54 to the releasing position is controlled by means operable independently of the movement of the main operating lever 18. A stud 70 interconnects the main operating lever 18 and the housing 28 so that upon movement of the main operating lever 18 in either direction the housing will be slid along the rod 22 in a corresponding direction, provided the locking means or cam member 54 is in position to permit this movement.

Conveniently operable means, independent of the movement of the main operating lever 18, is provided for releasing the locking means so as to permit releasing movement of the operating lever 18 in an opposite direction to release the applied brake. In the present instance this releasing mechanism takes the form of a second lever 72 arranged at one end to straddlingly overlie the main operating lever 18, and at the other end is provided with furcations 74 and 76 having registering apertures which pivotally fit about the pin 16, about which the main operating lever 18 pivots. In addition, this releasing lever is provided intermediate its length with a lateral extension, preferably in the form of a laterally struck out prong 78 which, due to the action of spring 80, housed within the second lever between it and the main operating lever 18, normally urges this releasing lever to the right, as shown in Fig. 1, or to such a position as not to press against the releasing toe or lug 58 of the locking means, the construction being that when the releasing means is pressed by the thumb toward the main operating lever 18, the prong or actuator 78 will contact the toe 58, shifting it in a clockwise direction or to the left, as viewed in Fig. 3, whereby to shift the locking means or cam into the position shown in Fig. 4, whereby to release the grip of this cam upon the rod 22. Thereafter, by manually shifting the main actuating lever 18 to the left or in a clockwise direction, as shown in Fig. 1, the connected brake actuating mechanism 52 will be shifted to brake releasing position.

It will thus be seen that by this arrangement I provide a very powerful manually actuated lever having connections to the brake actuating mechanism, which upon movement in a direction toward the driver is shifted along the rod 22 to apply the brake; that by reason of the expansive movement of the spring 68 and the arrangement of the toe 58 and its cooperative slot, this locking cam will be canted whereby to cause the gripping jaws thereof to grip the rod. This gripping movement will permit sliding movement of the cam along the rod 22 in a direction toward the right, as shown in Fig. 3, to apply the brake, but will prevent sliding movement in the opposite direction, whereby the brake will be held in any set position; and furthermore that when it is desired to release the brake, the operator, by gripping the manually operated lever 18 and pressing inwardly against the releasing lever 82 with the thumb, may release the brake in the manner hereinbefore described so that upon pushing the lever 18 away from him the brake is instantly released.

Changes may be made in the form, construction and arrangement of the parts without departing from the spirit of the invention or sacrificing any of its attendant advantages, and the right is hereby reserved to make all such changes as fairly fall within the scope of the following claims.

Having thus described my invention, what is claimed as new and is desired to be secured by Letters Patent of the United States is:

1. In a brake control mechanism having a brake applying member, the combination of a fixed bracket, a rod pivotally secured to said bracket, an operating member slidably mounted on said rod and connected to the brake applying member, detent means mounted on said operating member for locking said member and said rod against relative movement in a brake releasing direction, a lever connected to said operating member for moving said operating member in a brake applying direction, and releasing means mounted on said lever and engageable with said detent means for releasing said detent means from locking engagement with said rod.

2. In a brake control mechanism having a brake applying member, the combination of a fixed bracket, a rod secured to said bracket, an operating member comprising a housing having a plurality of wall portions, a pair of opposite wall portions of said housing having alined openings slidably receiving said rod, a locking member pivotally secured to one wall of said housing and having an enlarged opening receiving said rod, portions of the opening forming rod-gripping means, means connecting the operating member to the brake applying member, resilient means for normally tilting said locking member relative to said rod whereby to lock said operating member and said rod against relative movement in one direction, a manually operable lever pivotally secured to said bracket and having means connected to said operating member for shifting the latter along the rod to apply the brake, the locking member preventing movement of the member along the rod in a reverse direction, a second lever pivotally associated with said first mentioned lever, said second lever having an extension adapted upon movement of said lever in predetermined direction to engage said locking member to release its grip upon said rod, and spring means normally urging said second lever in predetermined direction to prevent said engagement.

3. In a brake control mechanism having a brake applying member, the combination of a fixed bracket, a rod secured to said bracket, an operating member comprising a housing having a plurality of wall portions, a pair of opposite wall portions in said housing having alined openings slidably receiving said rod, a locking member pivotally connected at one end to another wall portion of said housing, said housing having an enlarged opening in the opposite wall portion for slidably receiving the opposite end portion of said locking member, said locking member having an enlarged opening intermediate said end portions for slidably receiving said rod, means connecting the operating member to the brake applying member, a spring encircling said rod and interposed between one wall portion of said housing and said locking member for normally tilting said locking member relative to said rod whereby to lock said operating member and said rod against relative movement in one direction, a manually operable lever pivotally secured to said bracket, means connecting said lever to said operating member for operating the latter to release said rod and operating member for relative movement in the opposite direction, a second lever pivoted about the same axis about which said manually operable lever is pivoted to said bracket, said second mentioned lever having an extension adapted to engage a portion of the locking member when moved in predetermined direction to release the grip of the locking member on said rod, and spring means normally urging the second mentioned lever to position the operating extension out of contact with said locking member.

4. In a brake control mechanism having a brake applying member, the combination of a rod, a member shiftably mounted on said rod and adapted to be connected to the brake applying member, a manually operable lever for shifting said shiftable member in one direction, means for automatically locking said shiftable member against movement relative to said rod in the opposite direction, a thumb piece shiftably mounted on said lever and arranged to be engaged by the thumb of the hand of the operator when grasping said lever, and means actuated by thumb pressure movement of said thumb piece for releasing said locking means.

5. In a mechanism for controlling a brake applying member, the combination of a fixed support, a bar projecting from said support, an operating member slidably mounted on said bar and adapted to be connected to said brake applying member to move the latter to brake setting and releasing positions, a friction detent tiltably and slidably mounted on said bar, said operating member being operatively connected to the friction detent to slide said detent along said bar and to tilt the same into gripping engagement with the bar when the brake applying member has been moved by the operating member to a brake setting position, a first actuator operatively connected to the operating member for sliding the latter member along the bar, a second actuator operatively connected to the first actuator for movement therewith to brake setting and releasing positions, said second actuator being movable relative to the first actuator and operatively connected to the friction detent to move the detent out of gripping engagement with the bar.

6. In a mechanism for controlling a brake applying member, the combination of a fixed support, a bar projecting from said support, an operating member slidably mounted on said bar and adapted to be connected to said brake applying member to move the latter to brake setting and releasing positions, a friction detent tiltably and slidably mounted on said bar, resilient means interposed between the operating member and the friction detent for normally urging the detent into a tilting position on the bar, an operative connection between the detent and the operating member for causing the detent to be moved along the bar by said operating member and to be forced by said member into firm gripping engagement with the bar when the brake applying member has been moved by said operating member to a brake setting position, a first actuator operatively connected to the operating member for sliding the latter member along the bar, a second actuator operatively connected to the first actuator for movement therewith to brake setting and releasing positions, said second actuator being movable relative to the first actuator and operatively connected to the friction detent to move the detent out of gripping engagement with the bar.

7. In a mechanism for controlling a brake applying member, the combination of a fixed support, a rod pivotally mounted on said support and projecting therefrom, an operating member slidably mounted on said rod and adapted to be connected to said brake applying member to move the latter member to brake setting and releasing positions, a friction detent tiltably and slidably mounted on said rod, said detent having a projecting portion and said operating member having an enlarged opening for receiving said projecting portion to cause said detent to be moved along said rod by said operating member and to be tilted by said operating member into gripping engagement with the rod when the brake applying member has been moved by the operating member to a brake setting position, a first lever operatively connected to said operating member for sliding said member along the rod and a second lever having a portion adapted to engage said friction detent, an operative connection between said first and second levers for causing said second lever to move with said first lever to brake setting and releasing positions and permitting the movement of said second lever relative to the first lever to engage said friction detent to release the same from gripping engagement with the rod.

8. In a brake controlling mechanism having a brake applying member, the combination of a fixed support, a rod secured to said support, an operating member comprising a housing slidably received on said rod, a locking member pivotally secured to a wall of said housing and having an enlarged opening receiving said rod, means adapted to connect the operating member to the brake applying member to move the latter member to brake setting and releasing positions, said locking member being tilted on said rod to frictionally grip the rod to prevent movement of the operating member in a brake releasing direction when the brake applying member has been moved to a brake setting position, a manually operable lever pivotally secured to said support and having means engageable with said operating member for sliding said member along the rod to brake setting position, a second lever pivotally associated with the first mentioned lever, said second lever having an extension adapted to engage said locking member to release the same from gripping engagement with the rod.

9. In a brake control mechanism having a brake applying member, the combination of a rod, an actuating member slidably mounted on said rod and adapted to be connected to the brake applying member, a manually operable lever for shifting said actuating member in a brake setting direction, a friction detent slidably mounted on said rod and operatively connected to said actuating member for automatically locking said member against movement on the rod in a brake releasing direction, a thumb piece having a portion for engaging the friction detent to release said detent from the rod, said thumb piece being operatively connected to the lever for movement therewith to brake setting and releasing positions and relative thereto to release said detent when engaged by the thumb of a hand of the operator in grasping said lever.

MILLARD B. LUCKER.